US008696439B1

(12) United States Patent
Friedman et al.

(10) Patent No.: US 8,696,439 B1
(45) Date of Patent: *Apr. 15, 2014

(54) SLOT MACHINE WITH SYNCHRONIZED SPINNING REELS

(75) Inventors: Stacy Friedman, Beaverton, OR (US); Jon Muskin, Philadelphia, PA (US)

(73) Assignee: Olympian Gaming LLC, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/602,298

(22) Filed: Sep. 3, 2012

Related U.S. Application Data

(63) Continuation of application No. 11/612,841, filed on Dec. 19, 2006, now Pat. No. 8,257,159, which is a continuation of application No. 11/180,965, filed on Jul. 13, 2005, now abandoned.

(51) Int. Cl.

| | |
|---|---|
| *A63F 9/24* | (2006.01) |
| *A63F 13/00* | (2006.01) |
| *G06F 17/00* | (2006.01) |
| *G06F 19/00* | (2011.01) |

(52) U.S. Cl.
USPC .................................. 463/20; 463/16; 463/17

(58) Field of Classification Search
USPC ............................................................ 463/20
See application file for complete search history.

(56) References Cited

U.S. PATENT DOCUMENTS

| | | | | |
|---|---|---|---|---|
| 5,988,638 | A * | 11/1999 | Rodesch et al. | 273/143 R |
| 6,796,903 | B1 * | 9/2004 | Bryant | 463/20 |
| 2002/0019255 | A1 * | 2/2002 | Randall et al. | 463/20 |

* cited by examiner

*Primary Examiner* — Kevin Y Kim
(74) *Attorney, Agent, or Firm* — Muskin & Farmer LLC

(57) ABSTRACT

A slot machine that can spin two or more of the reels in unison. Thus, the machine can spin and stop the reels in a standard fashion. If a special trigger occurs, then two or more reels can further spin with an identical offset. The further spin can generate additional rewards for the player.

25 Claims, 2 Drawing Sheets

SLOT MACHINE WITH SYNCHRONIZED SPINNING REELS

CROSS REFERENCE TO RELATED APPLICATIONS

This application is a continuation application of U.S. application Ser. No. 11/612,841, filed on Dec. 19, 2006, entitled, "Slot Machine with Synchronized Spinning Reels", which is a continuation application of application Ser. No. 11/180,965, filed on Jul. 13, 2005, entitled, "Slot Machine with Synchronized Spinning Reels", both applications of which are incorporated by reference in their entireties.

BACKGROUND OF THE INVENTION

1. Field of the Invention

The present invention is directed to a method, apparatus, and computer readable storage medium directed to a slot machine that can spin with two or more reels locked in a simultaneous spin position.

2. Description of the Related Art

Slot machines are a billion dollar industry, both in the U.S. and around the world. Slot manufacturers are constantly seeking to improve their games with proprietary inventions, and these manufacturers can often derive substantial revenues if a proprietary game method becomes commercially successful. For example, U.S. Pat. No. 4,448,419 issued to Telnaes addresses a method for spinning slot machine reels. This invention was subsequently purchased by IGT and formed the basis for IGT's market dominance in the electromechanical slot machine industry for the past 20 years.

The majority of slot machines spin three reels independently in the same direction around a common axis. However, some games have incorporated novel methods of reel spinning. For example, a game called "Haywire" allows the reels to spin backwards and forwards like the machine is "broken" for a period of time. In "Balloon Bars" or "Double Diamond Deluxe," when a reel stops with a certain directional symbol either just above or below the payline, it will sometimes rotate downward or upward one step to rest on the payline. This is called a "nudge."

What is needed is a method for spinning the reels of a slot machine that is new and more exciting than prior art slot machines.

SUMMARY OF THE INVENTION

It is an aspect of the present invention to provide flexibility and innovations in spinning reels for a slot machine.

The above aspects can be obtained by a method that includes (a) determining an initial symbol stop on reel A, an initial symbol stop on reel B, and an initial symbol stop on reel C; (b) spinning reel A to stop on the initial symbol stop on reel A, spinning reel B to stop on the initial symbol stop on reel B, spinning reel C to stop on the initial symbol stop on reel C; (c) awarding the player a payout level based on the initial symbol stop on reel A and the initial symbol stop on reel B and the initial symbol stop on reel C; (d) if the initial symbol stop on reel A and the initial reel stop on reel B and the initial reel stop on reel C comprise a predetermined combination then performing the following: (e) moving reel A an offset number of symbols in a direction to stop on a final reel A stop; and (f) moving reel B the offset number of symbols in the direction to stop on a final reel B stop.

The above aspects can also be obtained by a method that includes (a) spinning a plurality of reels on the slot machine to form an initial reel combination; (b) triggering a special mode based on the initial reel combination; and (c) spinning and stopping two or more of the plurality of reels with an identical offset from the initial reel combination to form a final combination.

The above aspects can also be obtained by an apparatus that includes (a) a first spinning unit spinning a plurality of reels on the slot machine apparatus to form an initial reel combination; (b) a triggering unit triggering a special mode based on the initial reel combination; and (c) a second spinning unit spinning and stopping two or more of the plurality of reels with an identical offset from the initial reel combination to form a final combination.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
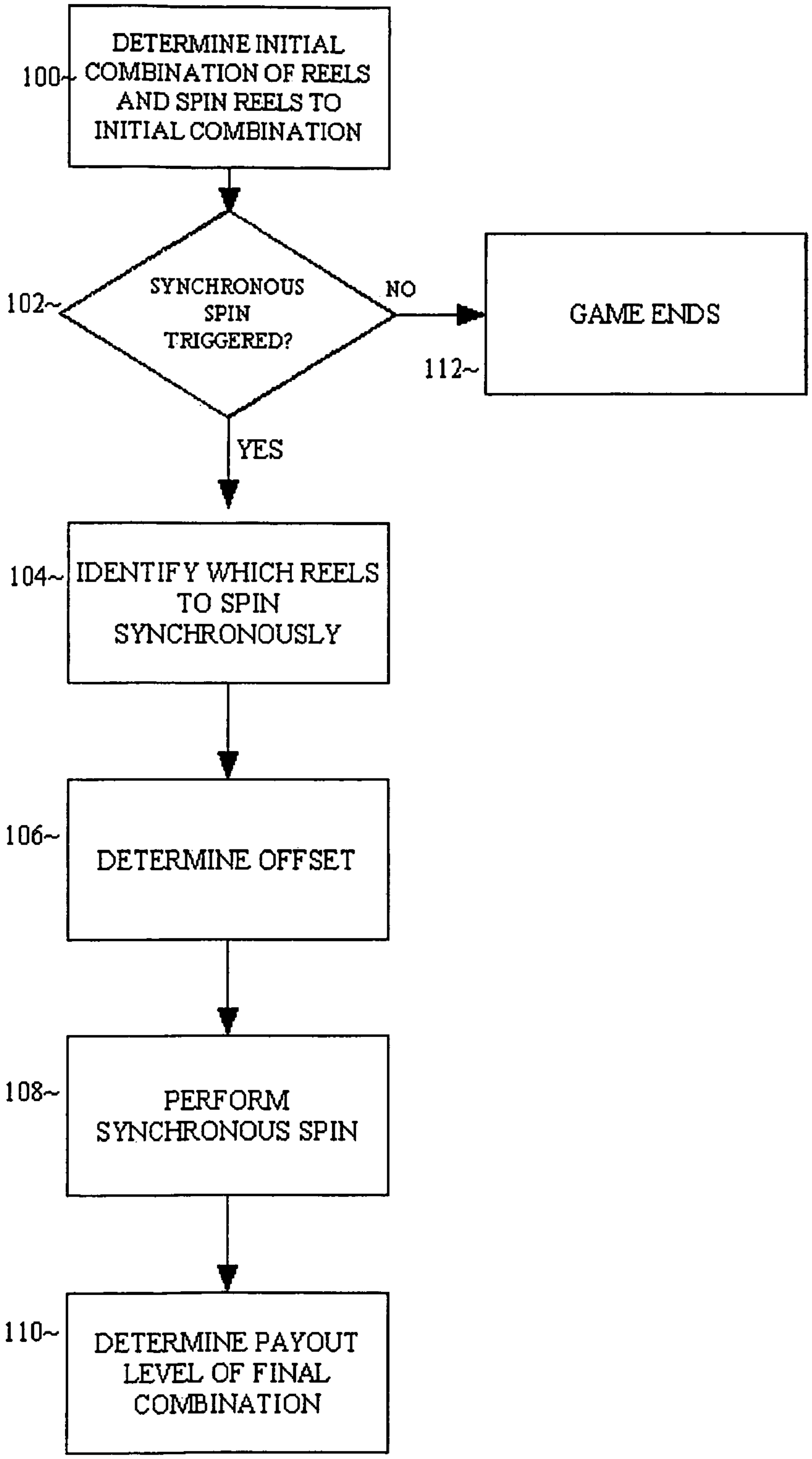
FIG. 1 is a flowchart illustrating an exemplary method of triggering and implementing a synchronized reel spin mode, according to an embodiment.

Reference will now be made in detail to the presently preferred embodiments of the invention, examples of which are illustrated in the accompanying drawings, wherein like reference numerals refer to like elements throughout.

The present inventive concept relates to a method, apparatus, and computer readable storage to trigger (optionally) and conduct a slot machine spin with reels that can spin synchronously. A synchronous spin (or "lockdown" mode/spin) can be considered a spin in which two or more vertical reels of a slot machine can move in unison, e.g. a same number of symbols are displaced for each reel ("an offset"). The offset can be a random number. Instead of triggering an instant lockdown spin (to be discussed herein), a lockdown spin can also be earned and "banked" for use on a later spin or saved for the next 3-symbol combination (or other trigger). When a lockdown spin is triggered, the player may be prompted that he or she has earned a lockdown spin and should press a button to generate the spin, or the lockdown spin can occur automatically (with or without a delay after the initial spin).

A typical 3-reel slot machine may have 22 physical stops on each real, each alternating symbol-blank-symbol-blank-etc. When a lockdown spin is performed when there are three symbols already on the payline, the value of the lockdown spin is greater than the value of a random spin. When a lockdown is triggered by having three symbols on the payline, the resulting payline will typically be either all three symbols or all three blanks.

Table I below illustrates an exemplary reel mapping for a two reel slot machine (reel A and reel B). It is noted that reel A does not necessarily correspond to the leftmost reel and that reel B does not necessarily correspond to the rightmost reel (e.g. reel A can be the rightmost reel and reel B can be the leftmost reel).

TABLE I

| reel stop | reel A symbol | reel B Symbol |
|---|---|---|
| 1 | cherry | cherry |
| 2 | blank | blank |
| 3 | cherry | cherry |
| 4 | blank | blank |
| 5 | bar | bar |
| 6 | blank | blank |

Note that the reels in Table I are identical (although they don't have to be), and are not weighted (although of course they can be). Note that the reel alternates with symbol/blank/symbol/blank/symbol/blank.

Table II below illustrates a sample payout of this two-reel machine.

TABLE II

| combination | payout | probability | contribution |
|---|---|---|---|
| cherry/cherry | 1 | 1/9 | .1111 |
| bar/bar | 50 | 1/64 | .78125 |
| cherry/bar | 0 | 1/24 | 0 |
| bar/cherry | 0 | 1/24 | 0 |
| overall | | | .89235 |

The expected return of the game exemplified in Tables I and II is 89.235%. This assumes there is no lockdown functionality. In this example, we will add a lockdown mode, and specify that the trigger in this case will be achieving all symbols on the payline but on a non-paying combination. The trigger can also be all symbols on the payline which includes paying combinations, any other trigger described herein, or any other combination of symbols can be used as a trigger.

Thus, in this example, the trigger will be achieving the cherry/bar or bar/cherry combinations. Thus, the lockdown spin in this example can be considered a consolation prize for achieving all symbols on the payline but no winning combination. The probability of triggering a lockdown spin in this example is 1/12. There are four possible lockdown combinations, depending on whether the player gets symbols: 1/5; 3/5; 5/1; 5/3. Once the lockdown mode is triggered, then the four possible "locked down" reel configurations are illustrated in Tables IIIa, IIIb, IIIc, and IIId, respectively.

TABLE IIIa

| reel stop | reel A symbol | reel B Symbol | payout |
|---|---|---|---|
| 1 | cherry | bar | |
| 2 | blank | blank | |
| 3 | cherry | cherry | 1 |
| 4 | blank | blank | |
| 5 | bar | cherry | |
| 6 | blank | blank | |

TABLE IIIb

| reel stop | reel A symbol | reel B Symbol | payout |
|---|---|---|---|
| 1 | cherry | cherry | 1 |
| 2 | blank | blank | |
| 3 | cherry | bar | |
| 4 | blank | blank | |
| 5 | bar | cherry | |
| 6 | blank | blank | |

TABLE IIIc

| reel stop | reel A symbol | reel B Symbol | payout |
|---|---|---|---|
| 1 | cherry | cherry | 1 |
| 2 | blank | blank | |
| 3 | cherry | bar | |
| 4 | blank | blank | |
| 5 | bar | cherry | |
| 6 | blank | blank | |

TABLE IIId

| reel stop | reel A symbol | reel B Symbol | payout |
|---|---|---|---|
| 1 | cherry | bar | |
| 2 | blank | blank | |
| 3 | cherry | cherry | 1 |
| 4 | blank | blank | |
| 5 | bar | cherry | |
| 6 | blank | blank | |

Note that in Tables Ma, IIIb, IIIc, and IIId, the reels are all aligned to be symbol/symbol or blank/blank. Thus, a single random spin of the reels synchronously may typically result in a higher hit frequency than a random spin of the individual reels (although this is not required), and a single random spin of the reels synchronously may result in a higher expected value than a random spin (although this is not required). The single random spin of the reels synchronously when non-paying symbols are aligned in the above example results in a higher hit frequency than a standard spin but a lower expected value for the spin. With a typical 3-reel configuration of 22 stops, a lockdown spin would preferably (although not required) have both a higher hit frequency and a higher expected value.

An additional lockdown spin as described above is worth 1/6 (or 0.16667). The probability of a lockdown spin as described above is 1/12. With the addition of the bonus single lockdown spin that pays once after being triggered by two non-paying symbols as in the above example, this results in an additional (1/6 *1/12) or 0.0138 in additional return for the player (in addition to the base game of 0.89235). The reels on a three reel game may be designed such that a lockdown spin increases the chances of the player hitting a large payout (e.g. a 7-7-7).

Table IV below illustrates another exemplary reel mapping for a two reel slot machine (reel A and reel B). It is noted that reel A does not necessarily correspond to the leftmost reel and that reel B does not necessarily correspond to the rightmost reel (e.g. reel A can be the rightmost reel and reel B can be the leftmost reel).

TABLE IV

| reel stop | reel A symbol | reel B Symbol |
|---|---|---|
| 1 | 7 | cherry |
| 2 | blank | blank |
| 3 | 7 | blank |

TABLE IV-continued

| reel stop | reel A symbol | reel B Symbol |
|---|---|---|
| 4 | blank | blank |
| 5 | blank | synchronous |
| 6 | blank | 7 |
| 7 | blank | blank |
| 8 | synchronous | blank |

The synchronous symbol (stop 8 on reel A and stop 5 on reel B) can be a special symbol used to trigger a special synchronous mode (also can be called a simultaneous reel spin mode, a unison mode, etc.), which can cycle through some or all offsets of reel A and reel B after the synchronous mode is triggered. A synchronous symbol may also be wild, or otherwise substitute for one or more other symbols to activate a winning award combination.

Table V illustrates one exemplary paytable to illustrate an embodiment of the present inventive concept.

TABLE V

| combination | payout |
|---|---|
| blank/blank | 0 |
| any/cherry | 1 |
| 7/7 | 15 |
| synchronous/synchronous | initiate synchronous spin |

When the synchronous mode is triggered (in this example by getting two synchronous symbols, although any other triggering conditions can be used as well), Table VI illustrates the possible combinations generated by cycling through all offsets of reel A and reel B (after the synchronous mode was triggered wherein reel A was at stop 8 and reel B was at stop 5).

TABLE VI

| synchronous combination # | reel A symbol | reel B Symbol | payout |
|---|---|---|---|
| 1 | 7 | 7 | 15 |
| 2 | blank | blank | 0 |
| 3 | 7 | blank | 0 |
| 4 | blank | cherry | 1 |
| 5 | blank | blank | 0 |
| 6 | blank | blank | 0 |
| 7 | blank | blank | 0 |
| 8 | synchronous | synchronous | n/a |

Thus, by earning a synchronous mode which in this example rotates reel A and reel B simultaneously through all stops results in two winning combinations: 7/7 and blank/cherry, for a total win of 16 using Table V.

Table VII below illustrates the effective payouts which include the synchronous mode (this is the same as Table V but with the value of the synchronous/synchronous combination included).

TABLE VII

| combination | payout |
|---|---|
| blank/blank | 0 |
| any/cherry | 1 |
| 7/7 | 15 |
| synchronous/synchronous | 16 |

Table VIII below illustrates the payout distribution for the reel mapping and paytable illustrated in Tables IV and V.

TABLE VIII

| winning payout | probability | payout | contribution |
|---|---|---|---|
| any/cherry | 1/8 | 1 | .125 |
| 7/7 | 1/32 | 15 | .46875 |
| synchronous/synchronous | 1/64 | 16 | .25 |
| total | n/a | n/a | .84375 |

The example above relates to a two reel game each with 8 non-weighted symbol stops, wherein the synchronous mode is earned by achieving two synchronous symbols, and the synchronous mode cycles the reels through all reel stops and awards prizes for each. Of course, this is just one example, and the methods described herein can be applied to games of any number of reels (e.g. 3, 5, etc.), any number of reel stops, weighted symbol stops, and any other parameters known for slot machine games. The synchronous mode can trigger a number of actions involving rotating two or more reels simultaneously. For example, the synchronous mode can simply respin two or more symbols in unison once.

The synchronous mode can be triggered in a number of ways: 1, 2, or more synchronous symbols can appear on a payline; a payline can have a predetermined number (including all) of non-blank symbols, a payline can have a predetermined number (including all) blanks, etc. The synchronous mode can also occur after each initial spin without a special conditional trigger.

Further examples of synchronous triggers/mode are as follows: A machine can have synchronous symbols on its reels, and when one or more reels displays a synchronous symbol, the synchronous mode is triggered which cause the reels without the synchronous symbol to remain stationary and spins the reel(s) with the synchronous symbol in the synchronous mode (if only one reel has the synchronous symbol then the synchronous mode may not be triggered or this reel can be spun on its own). The synchronous spin can occur once or can cycle through more than one (or perhaps all the symbol stops on a reel), paying on each winning combination. If three reels on a three reel machine result in the synchronous symbol, then all three reels can be "locked" and spun in unison (as described herein); optionally, before spinning all three reels in a synchronous mode, the reels can be respun once first and then the synchronous mode can be triggered.

Alternatively, a single synchronous symbol appearing on any of the reels may trigger a synchronous mode (including but not limited to any of the ones described herein). Further, a synchronous mode can be triggered without using special symbols but based on symbols already present on the machine or based on an attribute (hidden or visible) of symbols already present on the machine. For example, if the player gets three symbols (e.g. no blanks) on a payline (and no winning payout, or alternatively including a winning payout), then a synchronous mode can be triggered. Alternatively, if the player gets three (or any number of) blanks, a synchronous mode can be triggered. Alternatively, if the player gets a predetermined combinations (e.g. two 7's), a synchronous mode can be triggered. Certain particular symbols on a reel or reels (e.g. one or more particular 7's [or any symbol]) can trigger the synchronous mode, even though all such symbols on the reels may not trigger the synchronous mode.

A further example of an embodiment of the general inventive concept will be presented. Table IX represents another exemplary reel mapping for a two-reel machine with eight stops.

TABLE IX

| # | Reel A | Reel B |
|---|---|---|
| 1 | cherry | Bar |
| 2 | blank | Blank |
| 3 | bar | Bar |
| 4 | blank | Blank |
| 5 | seven | seven |
| 6 | blank | Blank |
| 7 | bar | seven |
| 8 | blank | Blank |

Table X below illustrates the frequency of each symbol for each real and the probability of occurrence for each reel. Note that in this example the symbols are non-weights (although weights can be used).

TABLE X

| Symbol | freq. A | freq. B | prob. A | prob. B |
|---|---|---|---|---|
| Cherry | 1 | 0 | 0.125 | 0 |
| bar | 2 | 2 | 0.25 | 0.25 |
| seven | 1 | 2 | 0.125 | 0.25 |
| blank | 4 | 4 | 0.5 | 0.5 |
| total | 8 | 8 | | |

Table XI below illustrates combinations of reel A and reel B, a exemplary payout, the probability and contribution of each respective payout, overall hit frequency, and overall return.

TABLE XI

| Combination | payout | prob | contrib | overall hit frequency | 0.21875 |
|---|---|---|---|---|---|
| cherry/any | 1 | 0.125 | 0.125 | | |
| bar/bar | 4 | 0.0625 | 0.25 | | |
| seven/seven | 15 | 0.03125 | 0.46875 | | |
| bar/seven | 0 | 0.0625 | 0 | | |
| seven/bar | 0 | 0.03125 | 0 | | |
| blank/bar | 0 | 0.125 | 0 | | |
| blank/seven | 0 | 0.125 | 0 | | |
| bar/blank | 0 | 0.125 | 0 | | |
| seven/blank | 0 | 0.0625 | 0 | | |
| blank/blank | 0 | 0.25 | 0 | | |
| | | 1 | 0.84375 | overall return | |

In this example, the synchronous mode is triggered on a bar/seven or seven/bar combination (of course any other combination can be used to trigger the synchronous mode as well). The probability of hitting a bar/seven or a seven/bar is 0.09375.

Once a synchronous mode is triggered, in this example there are four possible layouts for the synchronous spins. For example, the synchronous mode can be triggered if the first symbol (reel A) is stop number 3 (bar) and the second symbol (reel B) is stop number 5 (seven). Then the reels are aligned as illustrated in Table XII.

TABLE XII

| | | | | | |
|---|---|---|---|---|---|
| p(trigger this layout) | | 0.015625 | pay | | |
| cherry | bar | | 1 | | |
| blank | blank | | 0 | | |
| bar | seven | | 0 | | |
| blank | blank | | 0 | | |
| seven | seven | | 15 | | |
| blank | blank | | 0 | | |
| bar | bar | | 4 | | |
| blank | blank | | 0 | | |
| | | | 2.5 | total contrib | 0.039063 |
| | | | | hit frequency | 0.375 |

If the synchronous mode is triggered with the first symbol (reel A) is stop number 5 (seven) and the second symbol (reel B) is stop number 1 (bar), then the reels are aligned as illustrated in Table XIII. This layout can also be triggered with the first symbol (reel A) is stop number 3 (bar) and the second symbol (reel B) is stop number 7 (seven).

TABLE XIII

| | | | | | |
|---|---|---|---|---|---|
| p(trigger this layout | | 0.03125 | pay | | |
| cherry | seven | | 1 | | |
| blank | blank | | 0 | | |
| bar | seven | | 0 | | |
| blank | blank | | 0 | | |
| seven | bar | | 0 | | |
| blank | blank | | 0 | | |
| bar | bar | | 4 | | |
| blank | blank | | 0 | | |
| | | | 0.625 | Total contrib | 0.019531 |
| | | | | Hit frequency | 0.25 |

If the synchronous mode is triggered with the first symbol (reel A) is stop number 5 (seven) and the second symbol (reel B) is stop number 3 (bar), then the reels are aligned as illustrated in Table XIV. This layout can also be triggered with the first symbol (reel A) is stop number 7 (bar) and the second symbol (reel B) is stop number 5 (seven).

TABLE XIV

| | | | | | |
|---|---|---|---|---|---|
| p(trigger this layout | | 0.03125 | | | |
| Cherry | seven | | 1 | | |
| Blank | blank | | 0 | | |
| Bar | bar | | 4 | | |
| Blank | blank | | 0 | | |
| Seven | bar | | 0 | | |
| Blank | blank | | 0 | | |
| Bar | seven | | 0 | | |
| Blank | blank | | 0 | | |
| | | | 0.625 | total contrib | 0.019531 |
| | | | | hit frequency | 0.25 |

If the synchronous mode is triggered with the first symbol (reel A) is stop number 7 (bar) and the second symbol (reel B) is stop number 7 (seven), then the reels are aligned as illustrated in Table XV.

TABLE XV

| | | | | | |
|---|---|---|---|---|---|
| p(trigger this layout | | 0.015625 | | | |
| cherry | bar | | 1 | | |
| blank | blank | | 0 | | |
| bar | bar | | 4 | | |
| blank | blank | | 0 | | |
| seven | seven | | 15 | | |
| blank | blank | | 0 | | |
| bar | seven | | 0 | | |
| blank | blank | | 0 | | |
| | | | 2.5 | total contrib | 0.039063 |
| | | | | hit frequency | 0.375 |

Table XVI below is table identifying the total synchronous contribution to the overall return of the machine, the average synchronous spin return, the total return of the machine including the synchronous contribution, and the average synchronous spin hit frequency.

TABLE XVI

| | |
|---|---|
| total synchronous contribution | .117188 |
| average synchronous spin return | 1.25 |
| total return + synchronous contribution | .960938 |
| average synchronous spin hit frequency | .291667 |

Note that the synchronous spin hit frequency is higher than the overall hit frequency of the machine in a standard (non-synchronous spin) mode. Note that the expected return of a synchronous spin is also higher than the return of a spin in the standard mode.

When in the synchronous mode, if the resulting combination is also a synchronous mode trigger, then either the synchronous spin can end and play stops or another synchronous spin can be triggered.

FIG. 1 is a flowchart illustrating an exemplary method of triggering and implementing a synchronized reel spin mode, according to an embodiment.

The method can start with operation 100, which determines an initial combination of the reels after a spin, and performs the spin. The spin can stop at the initial combination. This is done as described herein or as known in the art. A payout level can be determined based on the initial combination. For example, if the initial combination does not comprise a winning combination then the payout level is zero. If the initial combination of the spin is a combination that pays 10 coins, then the payout level is 10. The player can be paid the payout level for the initial combination.

From operation 100, the method proceeds to operation 102, which determines whether the initial combination from operation 100 triggers a synchronous mode spin. The triggering condition can be chosen by the particular game and can be any of the triggering conditions described herein or as known in the art. The condition can also be a purely random determination as well (e.g. regardless of the result of the spin). If a synchronous spin is not triggered, then the method can proceed to operation 112 which ends the game and so the player can start a new game.

From operation 102, if a synchronous spin is triggered, then the method can proceed to operation 104, which identifies which reels to spin synchronously. This may be done based on the result of the spin from operation 100 and rules of the particular game. For example, the rules can trigger a synchronous spin when two or more reels have a synchronous spin symbol, or alternatively any other subset or reels, including all reels. The reels to spin synchronously may (but not required to be) be the reels that display a synchronous symbol. A synchronous symbol may also be present on less than all the reels, for example just the last reel. Thus a lockdown spin (or spins) can be triggered if the last reel displays a synchronous symbol, or a lockdown spin (or spins) can be triggered if the last reel displays a synchronous symbol with the other reels displaying a particular subset of symbols (such as any non-blank symbol). The synchronous symbol may or may not be wild. A spin can result in a paying combination and also a subsequent lockdown spin(s), or a spin may result in a non-paying combination but a lockdown spin(s), or of a paying combination but no lockdown spin(s).

From operation 104, the method can proceed to operation 106, which can determine an offset to spin the reels identified in operation 102. The offset can be determined according to the design choices of the particular game. For example, the offset can be a random number (e.g. from 1 to the number of reel stops on the symbols).

From operation 106, the method can proceed to operation 108, which performs a synchronous spin (e.g. spins the reels the offset number of symbols determined in operation 106). There may be a delay after the reels are stopped at the initial combination before the synchronous spin so that the player can appreciate the machine is now in a synchronous spin mode. Flashing lights, sounds, and any visual and/or audible indicators can be used to excite the player that he or she has earned a synchronous spin. In order to enhance the visual effect to the player, the reels can optionally be spun in a "slow motion" mode. A controller for a slot machine may issue a signal to the motor of each reel designating a speed and a symbol to stop at. For example, of the synchronous mode is triggered, and the synchronous spin is to spin the first reel and the second reel ten symbols ahead. The first reel and the second reel can be spun slowly symbol by symbol until the ten symbols pass upon which the reels can stop. In this way, the player can appreciate the fact that the reels are spinning synchronously. As described herein, as the reels spin in slow motion, awards can be generated based upon each (or some) intermediate set of symbols displayed, or awards can be generated based only the final symbols when the synchronous mode stops. When the synchronous mode is over and the reel(s) stop spinning, then the reels are now in a final combination.

From operation 108, the method can proceed to operation 110, wherein the machine determines (and pays) a payout level of the final combination. If the payout level of the final combination is greater than zero, then the player can be paid the payout level. Payout levels of the final combination may be the same (or may not be) as the payout levels of the initial combination. In other words, the payouts may be the same as if the player hit a winning combination initially, or the payouts may be different (e.g. greater or smaller).

It is noted that the operations in FIG. 1 can be performed in any sensible order. Typically, a slot machine determines an outcome of the spin as soon as the spin is commenced, and the spinning (and other action) of the machine is just for "show." A machine may determine the initial combination, whether the synchronous mode is triggered, and the final combination all before they actually occur to the player.

After a trigger, a lockdown spin can be performed just once (with a predetermined or random offset), or any number of times, paying on each lockdown spin. A lockdown spin can also use an offset of one and can be performed repeatedly. Alternatively, a lockdown spin can use an initial random offset, then performed repeated lockdown spins with an offset of one (or other number such as two). In this way, the player gets a lockdown spin with a random offset and then can also get further synchronous spins with identical offsets on each reel spinning in the lockdown mode.

In a further embodiment, a synchronous mode can also shift the symbols left or right, and replace the empty column of symbols with newly generated random symbols (or symbols from an additional reel not visible until the synchronous mode is triggered).

In another embodiment, if the player achieves all non-blank symbols on a payline, this can trigger the synchronous mode. If a game is uses weighted reels, the synchronous mode may or may not use weights when spinning the reels in the synchronous mode.

Slot machines can determine outcomes by choosing random symbol stops on each reel, and then displaying the chosen symbol stops on the reels. For example, on a 3 reel machine with 22 symbol stops, 3 random numbers can be chosen from 1-22 for each reel. After the numbers are chosen, the reels can be spun, and the results can be displayed.

An issue with this methodology is that it may be undesirable to have blanks appear, especially in the first column. The Telnaes patent addressed this issue by weighting reels, such that each symbol did not have an equal probability of being displayed on a payline.

A further method of eliminating blanks may be by determining the result of a spin, and then modifying the result, and then displaying the modified result. For example, a machine can spin reels, and if a blank appears on the first column, then the blank can be changed to another symbol which will not (or can) change the final payout of the determined combination. In this manner, resulting combinations can be more suspenseful for players.

An issue with the preceding methodology is that it may not be acceptable to regulatory authorities to change a result of a game after it has already been determined, even if the payout has already been established and remains static.

In a further embodiment, results of a slot machine spin can be determined using a mapping paradigm. A user initiates a spin upon which a slot machine determines the results of the spin (before the spin is actually finished spinning). This can be done in the following manner.

A table such as Table XVII below can be used to map spins for a two reel machine, each reel with two symbols (a blank and a bar). Consider that this machine pays on bar/bar but does not pay on any other combination.

TABLE XVII

| random number | result |
|---|---|
| 0 | blank/blank |
| 1 | blank/bar |
| 2 | bar/blank |
| 3 | bar/bar |

For example, a random number can be generated from 0-3, and the mapping from Table XVII (or any table) can be used to determine the outcome of the spin, and then the reels can be spun to display the outcome.

This methodology still results in blanks being displayed. Consider if Table XVII is copied 4 times as illustrated in Table XVIII.

TABLE XVIII

| random number | result |
|---|---|
| 0 | blank/blank |
| 1 | blank/bar |
| 2 | bar/blank |
| 3 | bar/bar |
| 4 | blank/blank |
| 5 | blank/bar |
| 6 | bar/blank |
| 7 | bar/bar |
| 8 | blank/blank |
| 9 | blank/bar |
| 10 | bar/blank |
| 11 | bar/bar |
| 12 | blank/blank |
| 13 | blank/bar |
| 14 | bar/blank |
| 15 | bar/bar |
| 16 | blank/blank |
| 17 | blank/bar |
| 18 | bar/blank |
| 19 | bar/bar |

A number from 1-19 can be selected and the respective results can then be displayed. Now consider table XIX, which eliminates the blank on the first column in all but one of the blank/blank results.

TABLE XIX

| random number | result |
|---|---|
| 0 | blank/blank |
| 1 | blank/bar |
| 2 | bar/blank |
| 3 | bar/bar |
| 4 | bar/blank |
| 5 | blank/bar |
| 6 | bar/blank |
| 7 | bar/bar |
| 8 | bar/blank |
| 9 | blank/bar |
| 10 | bar/blank |
| 11 | bar/bar |
| 12 | bar/blank |
| 13 | blank/bar |
| 14 | bar/blank |
| 15 | bar/bar |
| 16 | bar/blank |
| 17 | blank/bar |
| 18 | bar/blank |
| 19 | bar/bar |

The change from Table XVIII to Table XVIIII does not affect the payouts or the return of this machine, since bar/bar is the only combination that results in a payout. Now, if a number from 1-19 is picked and the outcome of the machine is determined according to the respective mapping, the problem of blanks in column 1 has been addressed and is now very unlikely. It can even be removed entirely.

This method can be used for machines with any number of reels, symbols, etc. It can be especially useful for non-weighted games (such as five-reel games) wherein it is desirous to enhance the effect of the game by providing more suspenseful outcomes than if the outcomes were chosen randomly.

A five reel machine that has 20 symbols on each reel can have 20^5 or 3,200,000 possible outcomes. All of the outcomes can be determined and mapped as described herein, and results can be "retouched" or modified so that resultant combinations can be more suspenseful. More suspenseful can be for example: more wild symbols (especially in the leftmost columns), more scatter symbols, more "near misses" on payouts (e.g. 4 consecutive symbols if 5 are required), etc. Preferably, modifying the symbols does not affect the payouts. An automated routine can determine which symbols to change. For example, the routine can be programmed to change every other blank (or any symbol) on the leftmost reel (or any reel) to a wild (or other symbol), if the change will not affect the payout (or even if the change does affect the payout) for that particular set of outcomes. On a five reel machine it can be assumed that all paylines will be active (although this is not required to be the case).

Further, the entire mapping of the machine does not need to be pregenerated randomly and then retouched, but can also be generated automatically. For example, a human or computer can select resultant symbols for each mapping as desired.

Figure 2:
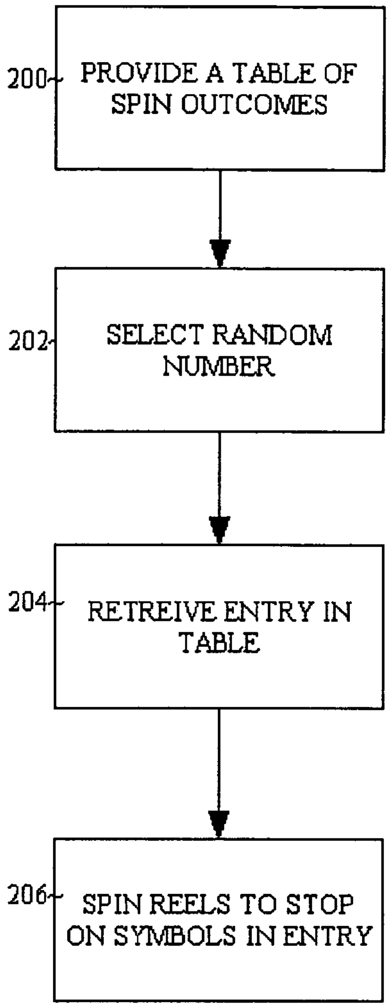
FIG. 2 is a flowchart illustrating an exemplary method of mapping a reel outcome, according to an embodiment.

FIG. 2 is a flowchart illustrating an exemplary method of mapping a reel outcome, according to an embodiment.

The method can begin with operation 200, wherein a table is provided which pre-stores spin results, such as Table XIX. This can be stored in any kind of computer memory, such as RAM, ROM, CD-ROM, flash memory, etc. The table can be that as described herein.

The method can proceed to operation 202, which selects a random number. The range of the number should typically be equal to the number of entries in the table.

From operation 202, the method can proceed to operation 204, which retrieves a respective entry in the table based upon the random number generated in operation 202. The entry in the table typically has results for all of the reels of the machine (any number of reels can be used).

From operation 204, the method can proceed to operation 206, which spins the reels to stop on the reel stops retrieved in operation 204. Each of the reels can be spin successively, as a standard slot machine does. The player has no idea the results of the spin were determined initially. The player also has no idea that the results of the spin were really chosen from a table.

Thus, using the method as illustrated in FIG. 2, reel stops can be determined which can make certain combinations more likely than other combinations. Thus combinations which have blanks in them can be made to occur less frequently. An advantage of this system over using weighted reels such as in the Telnaes patent, is that certain can be dependent upon other symbols. For example, in Telnaes, each symbol stops at a stop independent of where the other symbols have or will stop. Thus, in Telnaes, a result such as: blank/jackpot/blank may occur (a nonpaying combination on this machine).

In contrast, using the method described herein and illustrated in FIG. 2, the nonpaying result of: blank/jackpot/blank can be eliminated entirely or reduced in frequency to a very small probability. The undesirability of this combination is that the player receives a blank on the first symbol, which causes him to lose suspense. Instead, a result such as: jackpot/jackpot/blank (also a nonpaying combination on this machine) is preferable in that the player has received a "near miss."

Thus, using the method as described in FIG. 2, entire combinations can be made more and less likely. This is in contrast to Telnaes, which is concerned with individual reels/symbols but does not operate on the entire reel combination as a whole.

It is also noted that any and/or all of the above embodiments, configurations, variations of the present invention described above can mixed and matched and used in any combination with one another. Any claim herein can be combined with any others (unless the results are nonsensical). Further, any mathematical formula given above also includes its mathematical equivalents, and also variations thereof such as multiplying any of the individual terms of a formula by a constant(s) or other variable.

Moreover, any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a computer readable storage to control a computer.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of implementing a slot machine game utilizing reels displaying symbols, the method comprising the following operations:

executing instructions on a computer controlling the slot machine game to perform:

determining that a combination of displayed symbols comprises at least one predetermined combination(s) which triggers a synchronous mode which performs synchronous-mode operations A and B at least once:

(A) moving a first reel only an offset number of stops in a direction, wherein the offset number of stops is greater than zero;

(B) moving a second reel only the offset number of stops in the direction, wherein the first reel and the second reel are moved synchronously in unison; and awarding a payout, if earned, based on a final combination of displayed symbols.

2. A method as recited in claim 1, wherein one of the predetermined combination(s) comprises at least one synchronous symbol.

3. A method as recited in claim 2, wherein the at least one synchronous symbol is wild.

4. A method as recited in claim 1, wherein one of the predetermined combination(s) comprises a synchronous symbol on a third reel.

5. A method as recited in claim 1, wherein one of the predetermined combination(s) comprises a synchronous symbol on the first reel and a synchronous symbol on the second reel.

6. A method as recited in claim 1, wherein the slot machine game has at least three reels and one of the predetermined combination(s) comprises at least two synchronous symbols.

7. A method as recited in claim 1, wherein the synchronous-mode operations are performed at least twice, wherein after each performance a payout is awarded if earned.

8. A method as recited in claim 1, wherein the synchronous-mode operations are performed automatically without receiving input from a player.

9. A method as recited in claim 1, wherein the combination of displayed symbols occurred on an immediately prior spin.

10. A method as recited in claim 1, wherein the synchronous-mode operations are performed only after receiving input from a player.

11. A method as recited in claim 1, wherein the combination of displayed symbols did not occur on an immediately prior spin.

12. A method as recited in claim 1, wherein the instructions further include randomly determining the offset number of stops.

13. A method as recited in claim 1, wherein the offset number of stops is predetermined.

14. A method as recited in claim 13, wherein the offset number of stops is one.

15. A method as recited in claim 1, wherein a third reel moves but does not move only the offset number of stops in the direction nor synchronously in unison with the first reel and the second reel during the synchronous-mode operations.

16. A method as recited in claim 1, wherein a third reel is stationary during the synchronous-mode operations.

17. A method as recited in claim 1, wherein the synchronous-mode operations further comprise moving a third reel only the offset number of stops in the direction, wherein the first reel and the second reel and the third reel are moved synchronously in unison.

18. An electronic slot machine, comprising:

a display operable to display a plurality of reels displaying symbols;

a computer connected to the display, configured to:

determine if a combination of displayed symbols comprises at least one predetermined combination(s), and if so, trigger a synchronous mode which performs synchronous-mode operations A and B at least once:

(A) move a first reel only an offset number of stops in a direction, wherein the offset number of stops is greater than zero;

(B) move a second reel only the offset number of stops in the direction, wherein the first reel and the second reel are moved synchronously in unison; and award a payout, if earned, based on a final combination of displayed symbols.

19. An electronic slot machine as recited in claim 18, wherein the computer is further configured such that the synchronous-mode operations further comprise: hold a third reel stationary.

20. An electronic slot machine as recited in claim 18, wherein the computer is further configured such that the synchronous-mode operations further comprise: move a third reel the offset number of stops in the direction, wherein the first reel, the second reel, and the third reel are moved synchronously in unison.

21. An electronic slot machine as recited in claim 18, wherein the computer is further configured such that the synchronous-mode operations further comprise: move a third reel, wherein the third reel does not move only the offset number of stops in the direction nor synchronously in unison with the first reel and the second reel.

22. An electronic slot machine as recited in claim 18, wherein the computer is further configured such that the offset number of stops is one.

23. An electronic slot machine as recited in claim 18, wherein the computer is further configured such that the combination of displayed symbols is required to have occurred on an immediately prior spin.

24. An electronic slot machine as recited in claim 18, wherein the computer is further configured such that the combination of displayed symbols is not required to have occurred on an immediately prior spin.

25. An electronic slot machine as recited in claim 18, wherein the computer is further configured such that the synchronous-mode operations are performed at least twice, wherein after each performance a payout is awarded if earned.

* * * * *